(No Model.) 3 Sheets—Sheet 1.

M. J. OWENS.
GLASS BLOWER'S MOLD.

No. 588,926. Patented Aug. 24, 1897.

Witnesses:
J. R. Garfield
K. I. Clemons

Inventor,
Michael J. Owens
by Chapin
Attorneys.

THE NORRIS PETERS CO., PHOTO-LITHO., WASHINGTON, D. C.

(No Model.) 3 Sheets—Sheet 2.
M. J. OWENS.
GLASS BLOWER'S MOLD.
No. 588,926. Patented Aug. 24, 1897.
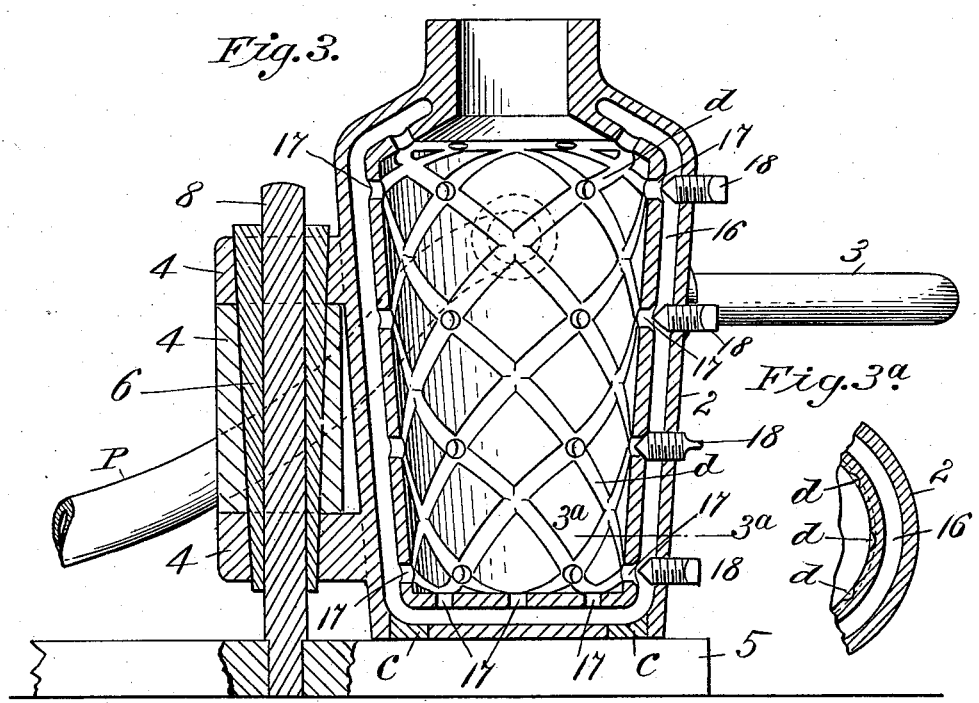
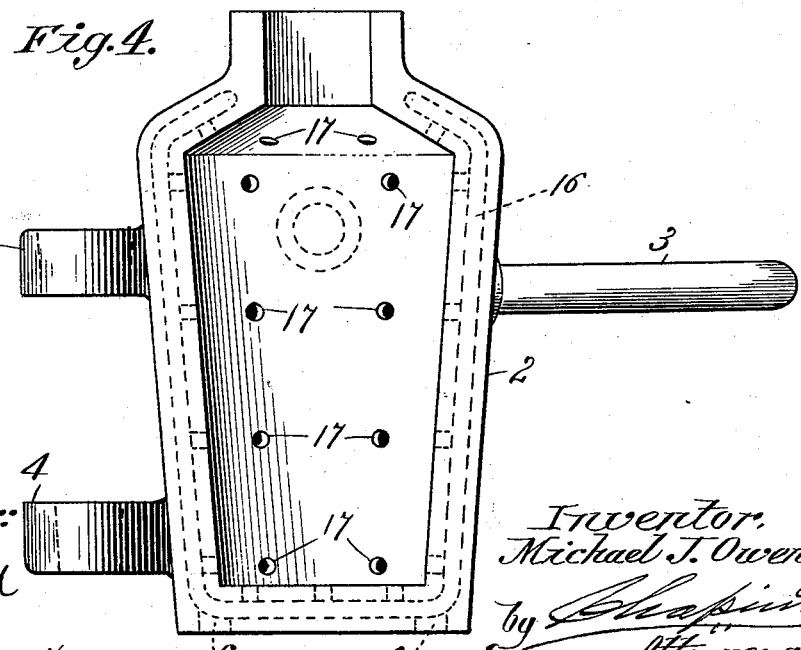
Witnesses:
J. D. Garfield
N. J. Clemons
Inventor:
Michael J. Owens,
by Chapin
Attorneys (No Model.) 3 Sheets—Sheet 3.

M. J. OWENS.
GLASS BLOWER'S MOLD.

No. 588,926. Patented Aug. 24, 1897.

Witnesses:
J. W. Garfield
K. I. Clemons

Inventor,
Michael J. Owens,
by Chappinth
Attorneys.

THE NORRIS PETERS CO., PHOTO-LITHO., WASHINGTON, D. C.

UNITED STATES PATENT OFFICE.

MICHAEL J. OWENS, OF TOLEDO, OHIO, ASSIGNOR TO THE TOLEDO GLASS COMPANY, OF SAME PLACE.

GLASS-BLOWER'S MOLD.

SPECIFICATION forming part of Letters Patent No. 588,926, dated August 24, 1897.

Application filed February 15, 1897. Serial No. 623,447. (No model.)

*To all whom it may concern:*

Be it known that I, MICHAEL J. OWENS, a citizen of the United States of America, residing at Toledo, in the county of Lucas and State of Ohio, have invented new and useful Improvements in Glass-Blowers' Molds, of which the following is a specification.

This invention relates to molds in which glass articles are blown and molded to the form of the interior of the mold by air-pressure, the object being to provide a mold of improved construction in respect to the admission of air thereinto, upon, or over the inner surface of the mold, whereby the blowing and molding of glass articles are greatly facilitated, for the reason that the improved mold permits of operating upon glass while nearly in the heated condition in which it is taken from the melting-pot, and consequently it is more plastic and easily worked, and for this reason the product of the mold is much increased; and the invention consists in the peculiar construction of the mold, whereby provision is made for the application of an air-supply under more or less pressure upon or over the surface of the inner wall of the mold which forms, so to speak, a pneumatic cushion intermediate of the article blown in the mold and the inner wall of the latter, which cushion constitutes a surface against which the plastic material may be moved in blowing and molding it, which offers less resistance to the movement of the article than does the inner wall of an ordinary mold.

Figure 1:
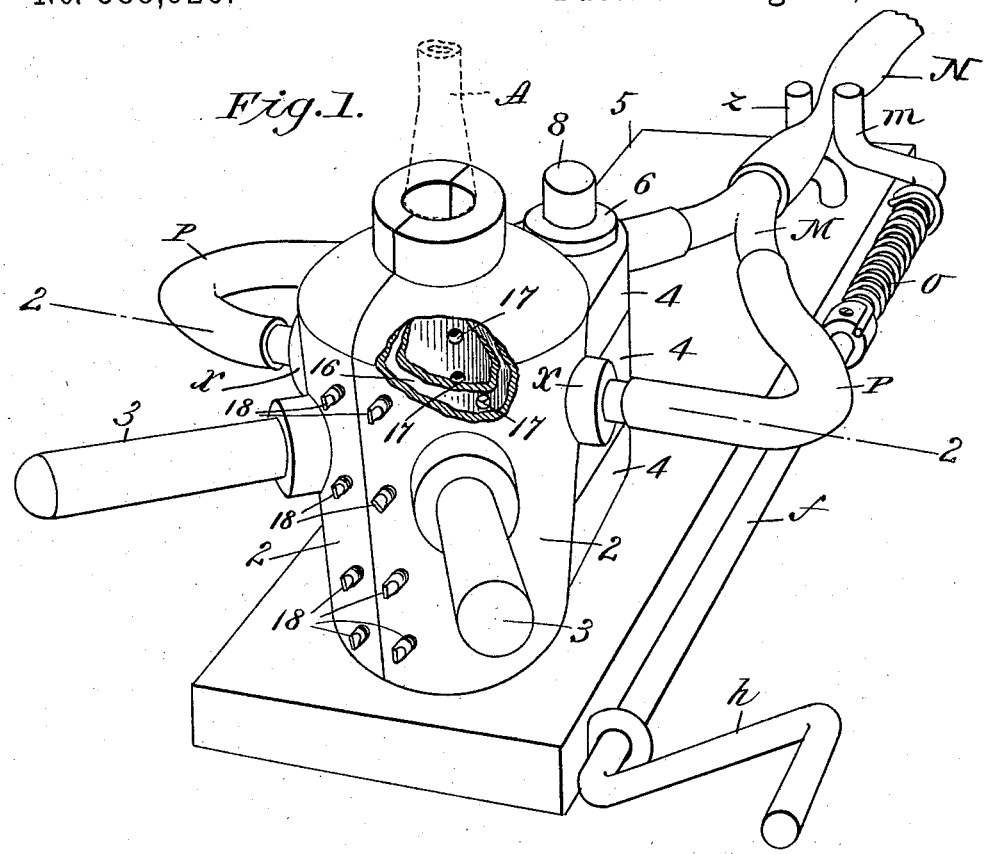
Figure 2:
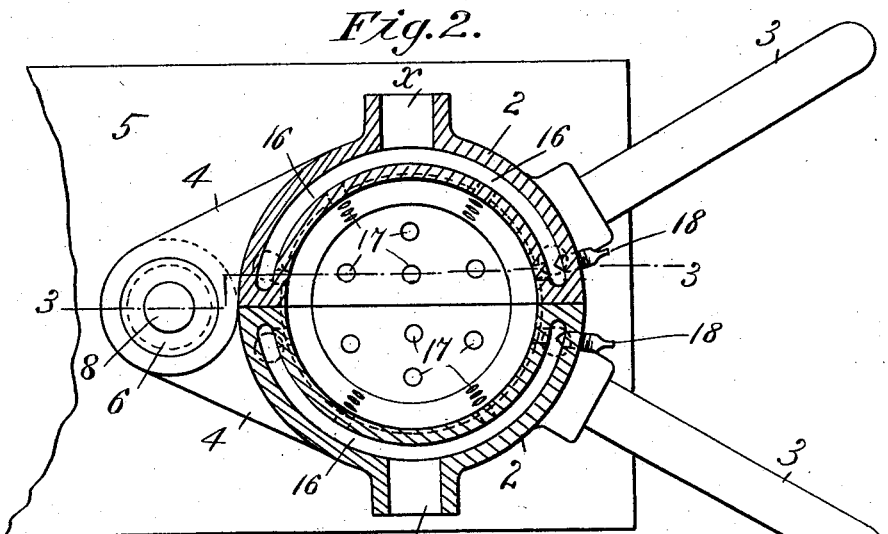
Figure 5:
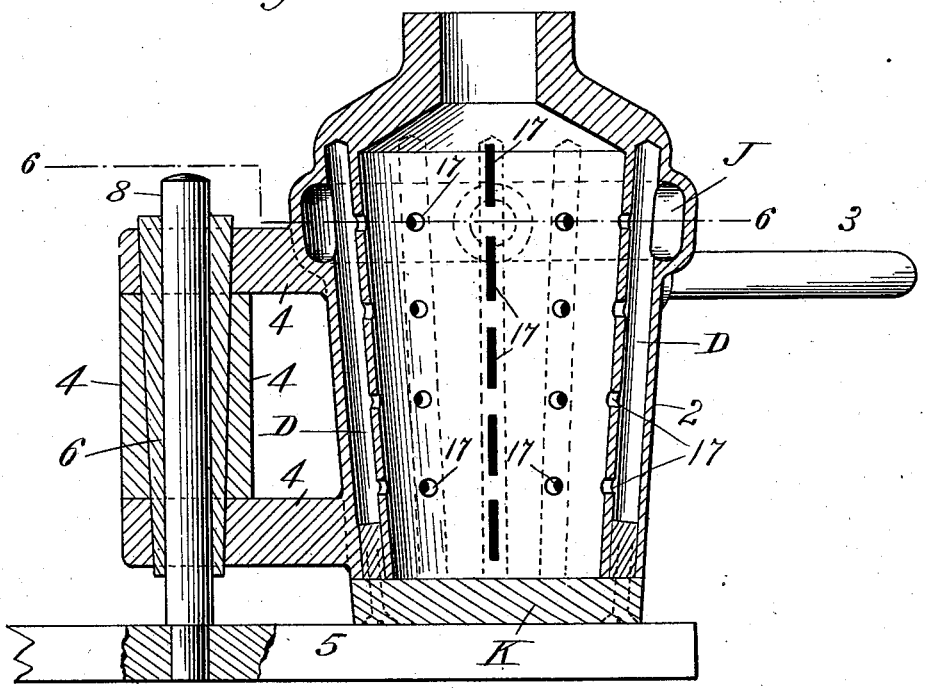
Figure 6:
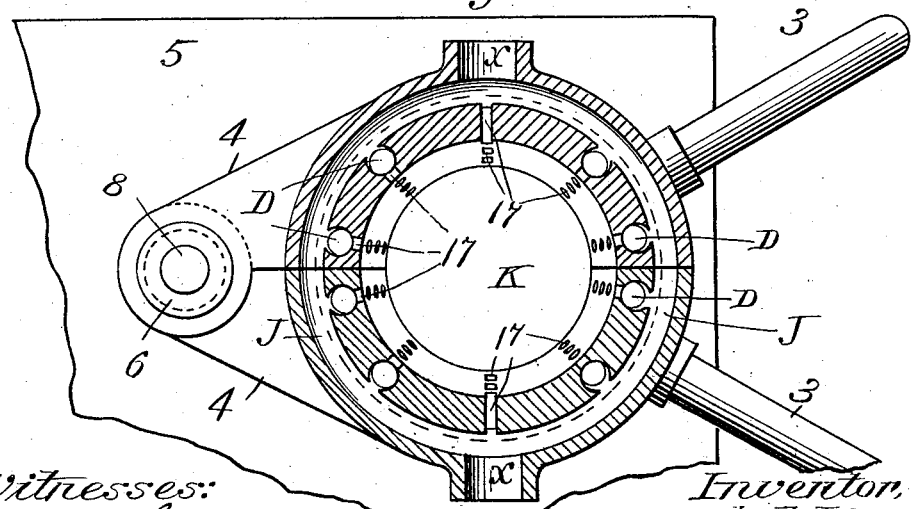

In the drawings forming part of this specification, Figure 1 is a perspective view of a mold for glassware embodying my improvements, said figure illustrating the mold resting on a suitable base and means for supplying air thereto and for regulating said supply. This figure also shows one of the sections of the mold partly broken away and indicating in dotted lines the lower end of an ordinary blow-iron in operative position on the upper end of the mold. Fig. 2 is a transverse section of the mold on line 2 2, Fig. 1. Fig. 3 is a vertical section of the mold and of the joint-uniting parts of the sections thereof, said joint parts being shown in section. Fig. 3ª is a section on line 3ª 3ª, Fig. 3. Fig. 4 is an elevation of one of the sections of the mold, showing the inner wall thereof. Fig. 5 is a similar view to Fig. 3, showing the body of the mold and the jointed parts thereof in section and the pintle of the joint in side elevation. Fig. 6 is a transverse section of the mold on line 6 6, Fig. 5.

Referring to the drawings, 2 2 indicate the mold-sections, which are of the general or any desired form, on each of which is shown a projecting bar or handle 3, which affords convenient means for opening and closing the sections, as is usual in manipulating a mold. The joint parts or bosses of the sections are indicated by 4 and interlock, as shown, as is usual in similar joints. Said bosses 4 are pierced to receive a tapering pintle-bushing 6, and within the latter is fitted the straight pintle 8 of the joint part. When the mold-sections are arranged to be operated on a simple flat base 5, as shown, the lower end of said pintle is fixed in said base, as shown in Figs. 3 and 5, thereby providing a fixed post upon which one or both of said sections 2 2 may swing when they are opened or closed.

The improved mold construction herein described and shown may be operated in connection with an ordinary blow-iron, as usual, manipulated solely by the glass-blower for blowing the glass article in the mold, or partly by said blower, and by any of the well-known machines for blowing glass. In Fig. 1 the ordinary position of the lower end of the said blow-iron on the upper end of the mold is indicated at A in dotted lines. To provide for the application of said pneumatic cushion over the surface of the inner wall of the mold, which is actively maintained during the glass-blowing operation, the said inner wall or any other suitable part of the mold is provided with one or more suitable apertures or air-passages, or such as are indicated by 17, of suitable area and of any suitable form similar to those shown in the several figures, preferably such as are shown in Fig. 5.

Air under suitable pressure, either uniform or variable, according to the requirements of the glass articles to be blown in the mold, is supplied through the outer wall or other part of each mold-section by devices hereinafter described, and any of the various air-chamber constructions shown in the drawings, or other suitable ones, may be adopted for the mold-sections 2 with which said apertures 17 communicate.

Figs. 1, 2, and 4 illustrate mold-sections, in which in casting the same an air-chamber 16 is formed between the inner and outer surfaces of the said sections, and in Figs. 5 and 6 is shown a series of vertical air-conduits D, extending within the walls of the mold-sections with which said apertures 17 communicate. Figs. 3 and 3ª illustrate a series of air channels or grooves d, extending between the passages 17, which may be employed, thereby facilitating the movement of the air over the surface of the glass article which is in process of formation in the mold. In said Figs. 5 and 6 a circular air-chamber J extends around each section 2 with which the said conduits D communicate. In Fig. 5 the lower ends of said conduits are closed by the bottom K of each mold-section 2, which is suitably secured thereto.

In casting the mold-sections 2 if the air-chambers 16 therein be cored the core-sand may be removed at openings in the bottom closed by plugs c, as indicated in Figs. 3 and 4.

It is sometimes found desirable to regulate the volume and force of the air-current which is supplied to the inner wall of the mold through said air-passages 17 more positively than can well be done by the main valve of the air-supply below described, and to this end as many air-valves 18 or other suitable device or devices may be applied to the outer wall of each mold-section, which valves are screwed through said wall opposite said passages 17, whereby the latter are restricted or enlarged at pleasure, thereby effecting a variable air-pressure between said inner wall of the mold and the surface of a glass article blown and formed therein. The general air-supply for each section 2 of the mold is provided by any suitable well-known means—as, for instance, a fan-blower. To said fan-blower a flexible air-conduit N may be connected, and connections between said conduit and the mold-sections may be made by means of a "twin" connection M or other suitable one, and this last-named connection be united with the mold-section 2 by two pieces of flexible tubing P P, and the latter are suitably connected, as shown, to a hub x on each of said sections. It is obvious that the connections or conduits between said fan or other source should be adapted to the requirements of the movable or other mold-sections. In Fig. 1 is illustrated convenient means, as below described, whereby the air-conduit N is kept normally closed, and may be conveniently opened by the glass-blower when air is required to be conveyed into the mold through said passages 17. A post z is fixed in said base 5 at one side of said conduit N. On the edge of said flat base 5 is supported revolubly a rod f, having a crank h on one end and an arm m on its opposite end opposite said post z. A coil-spring o on said rod f has one end attached to the latter and one end attached to said base, which spring acts in a well-known manner to exert a rolling force upon said rod, whereby said arm m is forced against said conduit N, and so compresses it as to prevent the passage of air therethrough.

In operating the said mold and the described air-supply devices connected therewith the glass-blower, having taken the molten glass upon the blow-iron, swings one or both sections of the mold apart by applying his foot to the bar or handle 3, and bringing the blow-iron over the mold he places the glass thereon between said mold-sections, closes the latter, and simultaneously applies his mouth to the iron and his foot upon the said crank h, thereby causing at the same time currents of air under the required pressure to act upon the interior and exterior surfaces of the article being blown while in the mold. When the blower removes his foot from said crank h, the air-supply from conduit N is automatically shut off, the mold is opened, and the blown glass article is removed from the mold on the blow-iron, as usual.

Having thus described my invention, what I claim, and desire to secure by Letters Patent, is—

1. A mold in which forms are imparted to warm plastic substances, provided with means for the introduction of air to the inner wall thereof, whereby the space between an article in process of formation in said mold and said wall, shall contain, temporarily, air under more or less pressure, substantially as set forth.

2. A mold in which forms are imparted to hot plastic substances having in the walls thereof one or more air-passages extending from the inner surface of the mold outwardly and means for conveying air to said passages whereby the same is delivered at said inner mold-surfaces, substantially as described.

3. A mold in which forms are imparted to hot plastic substances having in the walls thereof one or more air-passages extending from the inner surface of the mold outwardly, and means for conveying air to said passages and for regulating the delivery thereof through said passages to said inner surface under varying degrees of pressure, substantially as described.

4. A mold in which forms are imparted to hot plastic substances having within the walls thereof one or more air-chambers, and one or more air-passages extending from said chambers to the inner surface of the mold, and means for supplying air to said chambers under more or less pressure, substantially as described.

5. A mold in which forms are imparted to hot plastic substances having within the walls thereof one or more air-chambers, several air-passages extending from said chambers to the inner surface of the mold, air-conducting channels in the inner surface of the mold extending between said passages, and means for supplying air to said chambers under more or less pressure, substantially as set forth.

6. A mold in which forms are imparted to hot plastic substances having in the walls thereof one or more air-passages extending from the inner surface of the mold outwardly, means for conveying air to said passages whereby the same is delivered at said inner mold-surface, and valves in the wall of the mold adjustable relative to said passages, whereby the latter are restricted or enlarged, substantially as set forth.

MICHAEL J. OWENS.

Witnesses:
H. A. CHAPIN,
K. I. CLEMONS.